United States Patent [19]

Driemel et al.

[11] Patent Number: 4,963,629

[45] Date of Patent: Oct. 16, 1990

[54] COPOLYMERS OF UNSATURATED CARBOXYLIC ACIDS AND USE THEREOF

[75] Inventors: Klaus Driemel; Klaus Bunthoff, both of Duisburg; Helmut Nies, Rheinberg; Dieter Rohe, Dinslaken, all of Fed. Rep. of Germany

[73] Assignee: Grillo-Werke AG, Duisburg, Fed. Rep. of Germany

[21] Appl. No.: 391,941

[22] Filed: Aug. 10, 1989

Related U.S. Application Data

[63] Continuation-in-part of Ser. No. 184,424, Apr. 21, 1988, abandoned.

[30] Foreign Application Priority Data

May 2, 1987 [DE] Fed. Rep. of Germany ....... 3714732
Oct. 7, 1988 [DE] Fed. Rep. of Germany ....... 3834237

[51] Int. Cl.$^5$ .................. C08F 220/04; C08F 222/02; C08F 2/10; C08F 8/12

[52] U.S. Cl. ................ 526/200; 526/238.23; 527/300; 527/314; 252/174.23

[58] Field of Search ........ 527/314, 300, 311; 526/238.23, 200; 252/174.23

[56] References Cited

U.S. PATENT DOCUMENTS 4,647,396 3/1987 Denzinger et al. ............ 252/174.24
4,701,494 10/1987 Graafland ........................ 526/238.23

*Primary Examiner*—Nathan M. Nutter
*Attorney, Agent, or Firm*—Wegner & Bretschneider

[57] ABSTRACT

Copolymers of unsaturated carboxylic acids with alkaline solutions of monosaccharides or disaccharides capable of forming enolates provide polycarboxylates which are excellently suitable as sequestrants, complexing agents and co-builders in washing and cleaning agents.

16 Claims, No Drawings

COPOLYMERS OF UNSATURATED CARBOXYLIC ACIDS AND USE THEREOF

CROSS-REFERENCE TO RELATED APPLICATIONS

This is a Continuation-In-Part of copending U.S. application Ser. No. 184,424, filed Apr. 21, 1988, and now abandoned.

BACKGROUND OF THE INVENTION

* The present invention relates to copolymers of unsaturated carboxylic acids with other unsaturated compounds, a process for preparing same and the use thereof as a sequestering agent, complexing agent and co-builder in washing and cleaning agents.

Copolymers of unsaturated carboxylic avoids with other unsaturated compounds are known, for example from the German Patent Specification No. 19 04 940. Herein, copolymers of acrolein with acrylic acid have been described, which copolymers may be used as polycarboxylates as complexing agents.

Other polycarboxylates are known as copolymers of various unsaturated carboxylic acids. Thus, more particularly, there are known copolymers of acrylic acid, methacrylic acid and maleic acid and the use thereof as additives for washing and cleaning agents from the German Patent Specification (DE-PS) No. 26 16 261 and the German Published Unexamined Patent Applications (DE-OS) Nos. 29 10 133, 29 36 984, 32 33 775, 32 33 777, 34 26 368 and 36 04 223.

These polycarboxylates have gained increasing importance due to the introduction of low-phosphate or phosphate-free washing agents; cf. Diehl, "Phosphatfreies Waschen", Fette and Öle, Fettderivate, Folgeprodukte 112 (1986), pages 489 to 492, and Zini, "The Use of Acrylic Based Homo- and Copolymers as Detergent Additives", Chemieprodukte: Haushalt, Gewerbe, Industrie 83 (1987), pages 45 to 48.

A considerable disadvantage of the polycarboxylates used so far consists in that they are poorly biodegradable in sewage treatment plants. However, they are eliminated by absorption to the sewage sludge and, thus, will not get into the water. Similar products have been used for sewage sludge flocculation for years.*

The present invention relates to copolymers based on unsaturated carboxylic acids and monosaccharides capable of forming enolates. These copolymers are obtainable by copolymerizing the unsaturated carboxylic acids in an amount of from 35 to 80%, based on the total monomers, with an alkaline solution of the monosaccharides capable of forming enolates in the presence of free radical initiators at temperatures of between 60° C. and 110° C., while at least one of the two monomers is continuously supplied to the reaction batch, then cooled and precipitated by acidification. Furthermore, the invention relates to the use of said copolymers as a sequestering agent, complexing agent and co-builder in washing and cleaning agents.

It has also been found that, besides the monosaccharides capable of forming enolates, the disaccharides palatinose and leucrose are also capable of forming enolates and, thus, can be polymerized with unsaturated carboxylic acids in the same manner.

* An object of the present invention is to develop polycarboxylates which have an improved biodegradability and at the same time are inexpensive and may be produced simply and reliably.*

Another object of the present invention is to obtain in a simple way copolymers of unsaturated carboxylic acids by the reaction of monosaccharides capable of forming enolates with unsaturated carboxylic acids.

A further object of the present invention is to obtain copolymers of unsaturated carboxylic acids by the reaction of disaccharides capable of forming enolates, preferably palatinose and leucrose, with unsaturated carboxylic acids in a simple manner.

An additional object of the present invention is to achieve copolymer products which have favorable properties, such as calcium- and magnesium-binding capacities, for use as sequestering or complexing agents, or co-builders in washing and cleaning agents.

An advantage of the present invention is the production of copolymers using a mono- or di-saccharide component produced at reasonable cost from naturally reproducible raw materials.

SUMMARY OF THE INVENTION

* Now several of the objects and advantages of the invention have been attained in a surprisingly simple way by means of copolymers of unsaturated carboxylic acids which are obtainable by the reaction of alkaline solutions of monosaccharides capable of forming enolates with the unsaturated carboxylic acids in the presence of radical initiators, and preferably peroxides, at a temperature between 60° C. and 110° C.

This result was by no means foreseeable, since alkaline solutions of monosaccharides capable of forming enolates are known to be very unstable and tend to be rapidly decomposed. It has now been found that these solutions are relatively stable under the conditions used in the invention and, for example, are not discolored at all or only discolored to a minor degree as long as the polymerization or copolymerization with the unsaturated carboxylic acids is still proceeding. It is only after the unsaturated carboxylic acids have disappeared from the solution due to the polymerization that the usual decomposition and discoloration of the alkaline sugar solutions begins to take place.

The copolymers of the invention may be removed in a simple manner from the reaction mixture, namely by simple acidification whereby they are precipitated or deposited as a separate phase.

The acidified mother liquors essentially contain unreacted amounts of monosaccharides or disaccharides. These may be recovered and recycled. In many cases a recovery will even be unnecessary, and the entire reaction mixture may then be employed in the use according to the invention.

It is one particular advantage of the copolymers of the invention that the monosaccharide component is produced at reasonable cost from naturally reproducible raw materials and, thus, fossil raw materials will have to be used only for the unsaturated carboxylic acid.

Also surprising was that the copolymers of the invention have a significantly increased calcium and magnesium binding capacity, based on the proportion of the unsaturated carboxylic acid. Thus, the monosaccharide component in the copolymers contributes to a considerable extent to the binding capacity for calcium and magnesium.

Thus, the new copolymers are particularly suitable for use as sequestrants, complexants and co-builders in washing and cleaning agents.

The properties of the copolymers may be varied within relatively wide limits. Preferably, about 20 to 65% of monosaccharide are reacted with about 35 to 80% of unsaturated monocarboxylic acid.

Monosaccharides capable of forming enolates are, in the first place, glucose, fructose, mannose, maltose, xylose and galactose. Particularly preferred is, of course, glucose, since it is available at a particularly low price and in nearly unlimited amounts. It may also be employed for the purposes of the invention in a relatively unpurified form, since the contamination either will not be incorporated at all in the copolymer or will not interfere.

The process of the invention is preferably carried out by adding the unsaturated carboxylic acid and the radical initiator to the alkaline solution of the monosaccharide capable of forming an enolate and then slowly heating the mixture. The reaction starts above 60° C. and will then often become so vigorous that the temperature exceeds 110° C. This should be avoided, if possible, as then an undesirable increased decomposition occurs of the sugar having not yet been incorporated in the copolymer.

The unsaturated carboxylic acids include, in the first place, the monethylenically unsaturated monocarboxylic acids having from 3 to 10 carbon atoms, and preferably acrylic acid and methacrylic acid. However, in principle other unsaturated di-basic carboxylic acids such as maleic acid and itaconic acid may also be used.

As the radical-forming initiators peroxides are useful. Particularly simple is the use of hydrogen peroxide. *

In the copolymers of the invention obtained by polymerizing a disaccharide capable of forming enolates with unsaturated carboxylic acids, palatinose and leucrose are usable as the disaccharide.

Palatinose is a 6-O-α-D-glucopyranosyl-D--fructose, and leucrose is a 5-O-α-D-glucopyranosyl-D--fructose. These sugars are formed, for example, by the reaction of saccharose and fructose in the presence of glycosyltransferases. For example, palatinose is produced by Südzucker AG in Frankenthal, and so is leucrose in larger amounts by Pfeifer & Langen in Dormagen.

Other disaccharide compounds which are theoretically capable of forming enolates, for example sucrose (saccharose), apparently are sterically hindered to such a degree that no copolymerization with unsaturated carboxylic acids can be observed.

In the free radical copolymerization, palatinose, as well as leucrose, reacts very violently with acrylic acid and yields products which are slightly yellowish in color and have a comparably good calcium binding capacity. However, the degree of biodegradability in excess of 95% is even more favorable than that of the copolymers made by using the monosaccharides capable of forming enolates.

The preparation of the copolymers of palatinose and of leucrose is carried out in the same manner as that of the monosaccharides capable of forming enolates.

It is a particular advantage that unpurified fractions or fractions contaminated with other saccharides of palatinose and leucrose also may be employed, since the contaminants are not incorporated in the copolymer, or will not interfere. Inasmuch as glycosyl transferases which are not sufficiently specific or consist of mixtures of various glycosyl transferases are employed in the preparation of the palatinose or leucrose, there will be obtained mother liquors in the preparation of the palatinose or leucrose in which both palatinose and leucrose are present. A separation of such a mixture is possible only with extreme difficulties. Nevertheless, such mother liquors may be readily employed in the preparation of the copolymers according to the invention.

The usable unsaturated carboxylic acids include, in the first place, the monoethylenically unsaturated monocarboxylic acids having from 3 to 10 carbon atoms, and preferably acrylic acid and methacrylic acid. However, basically other unsaturated carboxylic acids such as maleic acid, itaconic acid, etc. may be used as well.

As the radical-forming initiators there are preferably used peroxides. Particularly simple is the use of hydrogen peroxide.

* The calcium binding capacity of the copolymers according to the invention is determined, for example, by turbidimetric titration using calcium acetate. For this purpose, 1 g of the copolymer to be examined is dissolved in 100 ml of distilled water, and then 10 ml of a 2% sodium carbonate solution is added thereto. The pH of this solution is adjusted to 11 and kept constant during the titration. The titration is carried out by adding a 4.4% calcium acetate solution until a distinct constant turbidity occurs which is determined by nephelometry. The addition of the calcium acetate solution is effected by adding 1 ml portions at intervals of 30 seconds each.

Some typical copolymers and the preparations thereof are described in the following examples.

EXAMPLE 1

One mole of glucose is dissolved in 30% aqueous sodium hydroxide solution (3 moles of NaOH dissolved in water) with stirring at 0° C. Then, 0.07 moles of $H_2O_2$ are added to this solution. The temperature remains at 0° C. Then, 3 moles of acrylic acid are added dropwise to the alkaline sugar-$H_2O_2$ solution. In the course thereof the temperature rises to about 75° C. The mixture is further heated to 85° C. From then on, the reaction proceeds exothermally and the temperature rises to 105° C. Once the temperature maximum has been reached, the mixture is immediately cooled to 20° C. A highly viscous solution is obtained. The calcium-binding capacity, based on the content of the active ingredient, is 450 mg of calcium carbonate per gram of the active substance. The content of active ingredient in the solution is 48% and is determined by acidification.

EXAMPLE 2

Three moles of acrylic acid are neutralized with 20% aqueous sodium hydroxide solution (3 moles of NaOH dissolved in water). One mole of glucose is dissolved in 200 g of water. To this solution 1 mole of $H_2O_2$ is added. Into a reaction vessel there are charged 200 g of water, heated at 85° C. The two previously prepared solutions are simultaneously added dropwise in the course of about 90 minutes. The pH value of the reaction medium is kept constant at pH 9.0 during the period of the dropwise addition. Upon completion of the addition of the total amounts the temperature once more rises to about 95 to 103° C. Then, the mixture is immediately cooled. A low-viscosity polymeric solution is obtained. The active ingredient content is 32%. The calcium binding capacity is 670 mg of calcium carbonate per gram of active substance.

EXAMPLE 3

Seventy-two grams of acrylic acid are neutralized with 200 g of 20% aqueous sodium hydroxide solution. One hundred grams of glucose are dissolved in 100 g of water. Into a reaction vessel there are charged 100 g of water. Into the glucose solution there are added 57 g of $H_2O_2$ (30%). The water in the reaction vessel is heated at 85° C. The above solutions are dropwise added within 50 minutes. The reaction temperature in the meantime climbs to 97° C. Upon termination of the addition, one waits until the temperature does not rise any further. The pH value is kept constant at 9.0 during the entire reaction. After the completion of the reaction, the mixture is immediately cooled (about 55 minutes). The content of active ingredient of this polymeric solution is 32%. The calcium binding capacity is 550 mg of calcium carbonate per gram of active substance.

EXAMPLE 4

Thirty-six grams of acrylic acid are neutralized with 100 g of 20% aqueous sodium hydroxide solution. One hundred grams of glucose are dissolved in 100 g of water. Thereto 57 g of 30% $H_2O_2$ are added. Into a reaction vessel there are charged 95 g of water, heated at 84° to 85° C. The reactant solutions are slowly added dropwise in the course of about 40 minutes. Once the dropwise addition has been completed, the temperature rises to a maximum of 97° C. During the total period of reaction the pH value is kept constant at from 9.3 to 9.5. After the temperature maximum has been reached, the mixture is immediately cooled. A polymeric solution having an active ingredient content of 30% is obtained. The calcium binding capacity of this solution is 43 mg of calcium carbonate per gram of active substance.

EXAMPLE 5

One hundred forty-four grams of acrylic acid are neutralized with 400 g of 20% aqueous sodium hydroxide solution. One hundred grams of glucose are dissolved in 100 g of water. Thereto 57 g of 30% $H_2O_2$ are dropwise added. Into a reaction vessel there are charge 240 g of water, heated at 80° to 85° C. The reactant solutions are added dropwise at a constant pH value of 9.1 within about 50 minutes. After the completion of the addition the temperature rises to a maximum of 97° C. (about 10 minutes after-reaction period). Then the mixture is immediately cooled. A polymeric solution is obtained which has an active ingredient content of 29%. The calcium binding capacity is 620 mg of calcium carbonate per gram of active substance.

EXAMPLE 6

Into a reaction vessel there are charged 100 g of glucose, dissolved in 200 g of water. One hundred ninety-five grams of itaconic acid are neutralized with 400 g of 30% aqueous sodium hydroxide solution. The reaction vessel with the glucose solution is heated to a reaction temperature of 80° C. To the heated glucose solution there is dropwise added within 110 minutes the neutralized itaconic acid solution. At the same time a solution of 57 g of 30% $H_2O_2$ in 100 g of water is added dropwise. The pH value is kept constant at 8.9 during the whole reaction. The reaction temperature rises for a time to 87° C. Once the addition has been completed, the solution is immediately cooled. The content of active ingredient in this polymeric solution is 35%. The calcium binding capacity is 250 mg of calcium carbonate per gram of active substance. The biodegradability is 80%.

EXAMPLE 7

One hundred twenty-nine grams of fructose are dissolved in 171 g of water and poured into the reaction vessel. One hundred and eight grams of acrylic acid are neutralized with 300 g of 20% aqueous sodium hydroxide solution. The fructose solution in the reaction vessel is brought to a temperature of 80° C. In the course of a period of 80 minutes the solution of the neutralized acrylic acid solution is slowly added dropwise. At the same time 57 g of a 30% $H_2O_2$ solution are added dropwise. During the reaction period the pH value is kept constant at 9.0. The reaction temperature increases to a maximum of 90° C. Upon completion of the addition of the reactant solutions (acrylic acid and $H_2O_2$) the reaction mixture is immediately cooled in the reaction vessel. The content of active ingredient in the polymeric solution is 35%. The calcium binding capacity is 550 mg of calcium carbonate per gram of active substance. The biodegradability is 88%.

EXAMPLE 8

Ninety grams of mannose are dissolved in 210 g of water and charged into the reaction vessel. One hundred and eight grams of acrylic acid are neutralized with 300 g of 20% aqueous sodium hydroxide solution. The reaction vessel with the mannose solution is heated at 80° C. Within a period of 60 minutes the neutralized acrylic acid and 57 g of 30% $H_2O_2$ are simultaneously added dropwise. The pH value is maintained at 9.0 during the reaction time. The reaction temperature rises to a maximum of 88° C. Upon completion of the addition of the acrylic acid and of the hydrogen peroxide, the reaction mixture is immediately cooled. The content of active ingredient in this polymeric solution is 30%. The calcium binding capacity is 550 mg of calcium carbonate per gram of active substance. The biodegradability is 80%.

EXAMPLE 9

One hundred grams of glucose are dissolved in 200 g of water and charged into the reaction vessel. The glucose solution is heated to 80° C. To this solution there are slowly added dropwise 130 g of 20% aqueous sodium hydroxide solution, over a period of 150 minutes. At the same time 57 g of 30% $H_2O_2$ are added dropwise. The reaction temperature rises to a maximum of 93° C. The pH value is kept constant at 9.0 during the entire reaction period. Upon completion of the dropwise addition of the reactants, the reaction mixture is immediately cooled. A polymeric solution is obtained which has an active ingredient content of 34%. The calcium binding capacity is 650 mg of calcium carbonate per gram of active substance. The biodegradability is 85%.

EXAMPLE 10

One hundred eighty grams of palatinose are dissolved in 220 g of water and charged into a reaction vessel. To this solution there are added 108 g of acrylic acid and 57 g of 30% $H_2O_2$. The solution is heated at 60° C. to 65° C. with stirring. Then the heat supply is stopped. Due to the exothermal reaction, the temperature rises to 80° C. whereupon by cooling the temperature is kept constant at 80° C. for 60 minutes. During the period of the experiment the pH value is kept constant at 9.0.

After 60 minutes of reaction time the reaction mixture is cooled. The content of the active substance of this polymeric solution is 31%. The calcium binding capacity is 520 mg of calcium carbonate per gram of active substance. The biodegradability is 97%.

EXAMPLE 11

One hundred eighty grams of palatinose are dissolved in 220 g of water and charged into a reaction vessel. To this solution there are added 108 g of acrylic acid and 57 g of 30% $H_2O_2$. The solution is heated at 55° C. Then the heat supply is turned off. The reactants are allowed to react for a period of 240 minutes with the temperature being controlled by cooling so that the temperature rises to a maximum of 64° C. The pH value is kept constant at 8.0 the entire time. The content of the active substance of this polymeric solution is 31%. The calcium binding capacity is 520 mg of calcium carbonate per gram of active substance. The biodegradability is 95%.

EXAMPLE 12

One hundred eighty grams of leucrose are dissolved in 220 g of water and charged into a reaction vessel. To this solution there are added 108 g of acrylic acid and 57 g of 30% $H_2O_2$. The solution is heated at 60° C. to 65° C. with stirring. Then the heat supply is stopped. Due to the exothermal reaction, the temperature rises to 80° C., whereupon by cooling the temperature is kept constant at 80° C. for 60 minutes. During the period of the reaction the pH value is kept constant at 9.0. After 60 minutes time of reaction the reaction mixture is cooled. The content of the active substance of this polymeric solution is 31%. The calcium binding capacity is 520 mg of calcium carbonate per gram of active substance. The biodegradability is 97%.

\* For the elucidation of the structure of the copolymers of the invention, the following assays were carried out with glucose/acrylic acid copolymers:
 (a) Slide rod-pyrolysis mass spectrometry;
 (b) Proton-NMR and $^{13}C$-NMR.

(a)
Once the substances have been introduced into the mass spectrometer using a slide rod, upon heating to 300° C. no mass signal showed in the spectrum. This means that up to 300° C. the substances do not exhibit any decomposition associated with a substantial decomposition of the molecule and removal of typical masses therefrom as associated with the heating of glucose esters or acrylic acid esters.

A repetition of the mass spectroscopical investigation by means of chemical ionization showed the same blank spectrum up to a temperature of 300° C.

(b)
Nuclear magnetic resonance investigation of the substances shows $^{13}C(^1H)$-signals of acrylic acid units at from 179.5 to 181.4 ppm of glucose units at 58.9 to 65.1 ppm diol units in the chain at 22.1 to 38.8 ppm. Ester units are not recognizable. See Table 1.

TABLE 1

| ppm | Integral | Intensity | |
|---|---|---|---|
| 181.3707 | 1.580 | 1.184 | |
| 180.9262 | 49.551 | 19.794 | |
| 180.6349 | 1.874 | 1.397 | \* COOH |
| 180.4875 | 0.898 | 0.974 | |
| 179.5488 | 1.052 | 0.923 | |

TABLE 1-continued

| ppm | Integral | Intensity | |
|---|---|---|---|
| 65.1 | | | \* CH—CH—CH— |
| 61.9219 | 1.641 | 1.043 | \| \| \| \| |
| 58.9 | | | OH OH OH OH |
| 43.5868 | 47.886 | 20.000 | COOH |
| 43.4905 | 30.602 | 17.636 | \| CH \* |
| 36.4364 | 16.745 | 6.594 | |
| 36.2912 | 7.315 | 4.476 | COOH |
| 35.9933 | 9.187 | 6.895 | \* \| |
| 35.8345 | 28.086 | 8.544 | $CH_2$—CH— |
| 35.5179 | 14.888 | 4.570 | |
| 38.8355 | 0.874 | | |
| 38.6064 | 0.686 | | \* \* |
| 38.0133 | 0.897 | | —C—C— |
| 37.5281 | 0.598 | | \| \| |
| 33.3900 | 1.748 | | OH OH |
| 30.4515 | 0.702 | | Enediol-unit built into polyacrylate strand |
| 28.8206 | 0.341 | | |
| 28.7262 | 0.431 | | |
| 28.3218 | 0.316 | | |
| 28.1331 | 0.261 | | |
| 22.1753 | 0.262 | | |

The signals were achieved with a 300 MHz-Instrument of $^{13}C(^1H)$ of a 30% solution of the copolymer of the invention, obtained from an enolate of a monosaccharide, in $D_2O$. The chemical shift refers to p-dioxan ($\delta_c = 67.6$).

The signals of 38.8355 to 22.1753 with the main peak at 33.3900 ppm suggest the manner in which the endiol—C=C—unit is inserted in the polyacrylate chain. The measurement of pure glucose, as a comparison, shows very intensive signals between 96.9 and 61 ppm. The copolymer, however, does not show any such signals. This demonstrates that glucose does not exist in the end product in free form or as an ester. If the sugar would be present in the form of an ester, the $^{13}C$-signals for COOR would be shifted at least for 3 ppm to higher values (See Stothers, "$^{13}C$-NMR-Spectroscopy", Academic Press, 1972, page 296). Pure polyacrylic acid shows intensive signals at 44 ppm and between 36.8 and 36.0 ppm. Below 40 ppm the spectrum is free of signals. Therefore, there are no interruptions of the chain by endiolate. Thus, the spectrum of the starting materials as well as that of a typical acrylic acid homopolymer are clearly different from that of the new product achieved by using enolates of monosaccharides according to the invention.

In accordance therewith there is present a C—C linkage between acrylic acid and glucose units. There are no sugar esters. This also follows from the fact that the process according to the invention is carried out in an aqueous medium with an excess of water, whereas sugar esters are formed only in an anhydrous medium by a reaction with acid chlorides or acid anhydrides. Sugar esters also do not have the effective properties of the compounds of the invention as washing agents, since the carboxyl groups necessary for the calcium- and magnesium-inhibitive action are missing.

In the following Table 2 there have been listed the calcium binding capacity and the degree of biodegradability of various batches of the copolymers from acrylic acid and glucose, compared to a commercially available polyacrylate and mixture comprising polyacrylate mixed with glucose at a ratio of 2:1. It will be apparent from this Table that the products according to the invention have a very high degree of biodegradability compared to that of commercially available polyacrylates. The increase of the degree of biodegradability upon the addition of glucose to the polyacrylic acid is restricted only to the glucose and corresponds to the proportion thereof.

TABLE 2

| Product (Batch No.) | $CaCO_3$ at 20° C. mg/g | $CaCO_3$ at 70° C. mg/g | Degree of Biodegradability | Molecular Weight |
|---|---|---|---|---|
| 170 | 560 | 540 | 80 | 95,000 |
| 199 | 600 | 600 | 82 | 60,000 |
| 181 | 430 | 410 | 94 | 130,000 |
| 174 | 680 | 670 | 85 | 20,000 |
| 162 | 560 | 530 | 80 | 110,000 |
| Polyacrylate | 600 | — | 0 | 70,000 |
| Polyacrylate + Glucose 2:1 | — | — | 30 | 70,000 +180 |

We claim:

1. A composition of matter comprising a copolymer of a monosaccharide enolate and an unsaturated carboxylic acid.

2. A composition of matter according to claim 1, wherein said unsaturated carboxylic acid is selected from the group consisting of unsaturated monocarboxylic acids having from 3 to 10 carbon atoms and unsaturated dibasic carboxylic acids having from 4 to 50 carbon atoms.

3. A composition of matter according to claim 1, wherein said monosaccharide is selected from the group consisting of glucose, fructose, mannose, xylose and galactose.

4. A sequestering agent comprising the copolymer according to claim 1.

5. A process for preparing a copolymer of a monosaccharide enolate and an unsaturated carboxylic acid which comprises:

reacting, at a temperature between 60° C. and 110° C., an unsaturated carboxylic acid with an alkaline solution of a monosaccharide capable of forming an enolate, said reacting conducted in the presence of a radical-forming initiator.

6. A process according to claim 5, wherein the pH of said solution is from 8 to 10 and said initiator is a peroxide.

7. A process for preparing a copolymer of a disaccharide enolate and an unsaturated carboxylic acid which comprises:

reacting, at a temperature between 60° C. and 110° C., an unsaturated carboxylic acid with an alkaline solution of a disaccharide capable of forming an enolate, said reacting conducted in the presence of a radical-forming initiator.

8. A process according to claim 7, wherein the pH of said solution is from 8 to 10 and said initiator is a peroxide.

9. A process according to claim 7, wherein said disaccharide is selected from the group consisting of maltose palatinose and leucrose.

10. A process according to claim 9, wherein the unsaturated carboxylic acid is copolymerized in an amount of 35 to 80% based on total monomer amount, while at least one monomer is continuously supplied during said reacting, followed by cooling and precipitating by acidification.

11. A process according to claim 9, wherein said unsaturated carboxylic acid is selected from the group consisting of acrylic acid and methacrylic acid.

12. A composition of matter comprising a copolymer of a disaccharide enolate and an unsaturated carboxylic acid.

13. A composition of matter according to claim 12, wherein said disaccharide is selected from the group consisting of maltose palatinose and leucrose.

14. A composition of matter according to claim 13, wherein said unsaturated carboxylic acid is selected from the group consisting of acrylic acid and methacrylic acid.

15. A complexing agent comprising the copolymer according to claim 14.

16. A cleaning agent comprising the copolymer according to claim 13.

* * * * *